(12) United States Patent
Tiwana et al.

(10) Patent No.: US 7,069,324 B1
(45) Date of Patent: Jun. 27, 2006

(54) METHODS AND APPARATUS SLOW-STARTING A WEB CACHE SYSTEM

(75) Inventors: Gurumukh S. Tiwana, Cupertino, CA (US); Danny Kwok, Los Altos, CA (US); James A. Aviani, Jr., Santa Barbara, CA (US); Martin Cieslak, Fremont, CA (US); Martin A. Kagan, Burlingame, CA (US); Stewart L. Forster, Bentleigh (AU)

(73) Assignee: Cisco Technology, Inc., San Jose, CA (US)

( * ) Notice: Subject to any disclaimer, the term of this patent is extended or adjusted under 35 U.S.C. 154(b) by 732 days.

(21) Appl. No.: 09/608,549

(22) Filed: Jun. 30, 2000

(51) Int. Cl.
G06F 15/16 (2006.01)
G06F 15/167 (2006.01)

(52) U.S. Cl. ...................... 709/226; 709/215
(58) Field of Classification Search ................ 709/215, 709/217, 218, 219, 231, 203, 226, 232, 233, 709/234, 235; 711/170, 171, 172, 173, 133, 711/135, 136, 159, 160
See application file for complete search history.

(56) References Cited

U.S. PATENT DOCUMENTS

| | | | | |
|---|---|---|---|---|
| 5,014,265 A | * | 5/1991 | Hahne et al. | 370/236 |
| 5,210,829 A | * | 5/1993 | Bitner | 710/57 |
| 5,414,704 A | | 5/1995 | Spinney | |
| 5,488,412 A | | 1/1996 | Majeti et al. | |
| 5,506,987 A | | 4/1996 | Abramson et al. | |
| 5,581,736 A | * | 12/1996 | Smith | 711/170 |
| 5,586,121 A | | 12/1996 | Moura et al. | |
| 5,634,125 A | * | 5/1997 | Li | 707/203 |
| 5,687,369 A | * | 11/1997 | Li | 707/203 |
| RE35,774 E | | 4/1998 | Moura et al. | |
| 5,818,845 A | | 10/1998 | Moura et al. | |
| 5,819,083 A | * | 10/1998 | Chen et al. | 707/10 |
| 5,828,655 A | | 10/1998 | Moura et al. | |
| 5,859,852 A | | 1/1999 | Moura et al. | |

(Continued)

FOREIGN PATENT DOCUMENTS

WO WO98/31107 7/1998

OTHER PUBLICATIONS

Cisco Systems, Inc., Release Notes for Cisco Cache Engine 500 Series, Software Version 2.1.0.*

(Continued)

Primary Examiner—Jason Cardone
Assistant Examiner—Thomas Duong
(74) Attorney, Agent, or Firm—Beyer Weaver & Thomas LLP (57) ABSTRACT

Methods and apparatus are described for intelligently assigning a portion of a cluster's traffic (e.g., buckets) to a cache system to minimize overloading of such cache system. In general terms, when a new cache system enters a cache cluster and/or starts up, the new cache system's full bucket allocation is not immediately assigned to the new cache system. Instead, only a portion of the full bucket allocation is initially assigned to the new cache system. In one embodiment, the new cache system's bucket assignment is gradually increased until the cache system is handling it's full bucket allocation or it becomes overloaded. The cache system's load is also checked periodically to determine whether it has become overloaded. When the cache system becomes overloaded, buckets are immediately shed from the cache system. In sum, the new cache system's load is adjusted until it is handling an optimum number of buckets.

34 Claims, 6 Drawing Sheets

U.S. PATENT DOCUMENTS

| | | | |
|---|---|---|---|
| 5,872,773 | A | 2/1999 | Katzela et al. |
| 5,892,903 | A | 4/1999 | Klaus |
| 5,946,047 | A | 8/1999 | Levan |
| 5,946,048 | A | 8/1999 | Levan |
| 5,950,205 | A | 9/1999 | Aviani, Jr. |
| 5,953,335 | A | 9/1999 | Erimli et al. |
| 5,956,346 | A | 9/1999 | Levan |
| 5,959,660 | A | 9/1999 | Levan |
| 5,959,968 | A | 9/1999 | Chin et al. |
| 5,959,997 | A | 9/1999 | Moura et al. |
| 5,989,060 | A | 11/1999 | Coile et al. |
| 6,006,266 | A | 12/1999 | Murphy et al. |
| 6,016,388 | A | 1/2000 | Dillon |
| 6,052,718 | A | 4/2000 | Gifford |
| 6,345,294 | B1 | 2/2002 | O'Toole et al. |
| 6,370,614 | B1 * | 4/2002 | Teoman et al. ............ 711/113 |
| 6,385,642 | B1 * | 5/2002 | Chlan et al. ............... 709/203 |
| 6,405,256 | B1 * | 6/2002 | Lin et al. ................... 709/231 |
| 6,442,661 | B1 * | 8/2002 | Dreszer ...................... 711/170 |
| 6,463,454 | B1 * | 10/2002 | Lumelsky et al. ......... 709/105 |
| 6,463,509 | B1 * | 10/2002 | Teoman et al. ............ 711/137 |

OTHER PUBLICATIONS

Eager et al., "Adaptive Load Sharing in Homogeneous Distributed Systems," IEEE, Transactions on Software Engineering, vol. Se-12, No. 5, May 1986, pp. 662-675.

Akamai Technologies, Inc. -Global Internet Content Delivery-"How FreeFlow Works," webmaster@akamai.com 1999-2000.

Digital Island, Inc. -e-Business Without Limits-, "Enabling Technologies," http://www.digisle.net. No date.

Internap, "Preferred Collocation Services," http://www.internap.com Copyright © 2001 Internap Network Services Corporation.

Meyer, et al., Request For Comments No. 2026, entitled, "Generic Routing Encapsulation (GRE)," Jan., 2000, Internet Engineering Task Force, 9 pages.

Mockapetris, P., Request For Comments No. 1034, entitled, "Domain Names—Concepts and Facilities," Nov., 1987, Internet Engineering Task Force, 31 pages.

Information Sciences Institute, Request for Comments No. 793, entitled, "Transmission Control Protocol—DARPA Internet Program—Protocol Specification," Sep., 1981, Internet Engineering Task Force, 49 pages.

David M. Gifford, "Replica Routing," U.S. Appl. No. 09/472,964, filed Dec. 28, 1999, 37 Pages.

Johnson et al., "Dynamic Server Organization," U.S. Appl. No. 09/294,837, filed Apr. 19, 1999, 42 Pages.

Lu et al., "Automatic Network Addresses Assignment and Translation Interference," U.S. Appl. No. 60/160,535, filed Oct. 20, 1999, 127 Pages.

Lu et al., "Method and Apparatus for Automatic Network Address Assignment," U.S. Appl. No. 60/178,063, filed Jan. 24, 2000, 74 Pages.

Johnson et al., "Method and Apparatus for Determining a Network Topology in the Presence of Network Address Translation," U.S. Appl. No. 60/178,062, filed Jan. 24, 2000, 32 Pages.

Toole et al., "Fast-Changing Network Status and Load Monitoring and Feedback," U.S. Appl. No. 60/177,985, filed Jan. 25, 2000, 20 Pages.

Kirk Johnson, "A Method and Apparatus for Minimalist Approach to Implementing Server Selection," U.S. Appl. No. 60/177,415, filed Jan. 21, 2000, 39 Pages.

* cited by examiner

METHODS AND APPARATUS SLOW-STARTING A WEB CACHE SYSTEM

BACKGROUND OF THE INVENTION

The present invention relates to transmission of data in a network environment. More specifically, the present invention relates to methods and apparatus for redirecting network traffic. Still more specifically, techniques are described herein for redirecting packet flows from a device that does not own the flows.

Generally speaking, when a client platform communicates with some remote server, whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address of the client platform and the source port would be one of the TCP ports selected by the client. These five pieces of information define the TCP connection.

Given the increase of traffic on the World Wide Web and the growing bandwidth demands of ever more sophisticated multimedia content, there has been constant pressure to find more efficient ways to service data requests than opening direct TCP connections between a requesting client and the primary repository for the desired data. Interestingly, one technique for increasing the efficiency with which data requests are serviced came about as the result of the development of network firewalls in response to security concerns. In the early development of such security measures, proxy servers were employed as firewalls to protect networks and their client machines from corruption by undesirable content and unauthorized access from the outside world. Proxy servers were originally based on Unix machines because that was the prevalent technology at the time. This model was generalized with the advent of SOCKS which was essentially a daemon on a Unix machine. Software on a client platform on the network protected by the firewall was specially configured to communicate with the resident demon which then made the connection to a destination platform at the client's request. The demon then passed information back and forth between the client and destination platforms acting as an intermediary or "proxy".

Not only did this model provide the desired protection for the client's network, it gave the entire network the IP address of the proxy server, therefore simplifying the problem of addressing of data packets to an increasing number of users. Moreover, because of the storage capability of the proxy server, information retrieved from remote servers could be stored rather than simply passed through to the requesting platform. This storage capability was quickly recognized as a means by which access to the World Wide Web could be accelerated. That is, by storing frequently requested data, subsequent requests for the same data could be serviced without having to retrieve the requested data from its original remote source. Currently, most Internet service providers (ISPs) accelerate access to their web sites using proxy servers.

Unfortunately, interaction with such proxy servers is not transparent, requiring each end user to select the appropriate proxy configuration in his or her browser to allow the browser to communicate with the proxy server. For the large ISPs with millions of customers there is significant overhead associated with handling tech support calls from customers who have no idea what a proxy configuration is. Additional overhead is associated with the fact that different proxy configurations must be provided for different customer operating systems. The considerable economic expense represented by this overhead offsets the benefits derived from providing accelerated access to the World Wide Web. Another problem arises as the number of WWW users increases. That is, as the number of customers for each ISP increases, the number of proxy servers required to service the growing customer base also increases. This, in turn, presents the problem of allocating packet traffic among multiple proxy servers.

Network caching represents an improvement over the proxy server model. Network caching is transparent to end users, high performance, and fault tolerant. By altering the operating system code of an existing router, the router is enabled to recognize and redirect data traffic having particular characteristics such as, for example, a particular protocol intended for a specified port (e.g., TCP with port 80), to one or more network caches connected to the router via an interface having sufficient bandwidth. If there are multiple caches connected to the cache-enabled router, the router selects from among the available caches for a particular request based on the destination IP address specified in the packet.

The network cache to which the request is re-routed "spoofs" the requested destination platform and accepts the request on its behalf via a standard TCP connection established by the cache-enabled router. If the requested information is already stored in the cache it is transmitted to the requesting platform with a header indicating its source as the destination platform. If the requested information is not in the cache, the cache opens a direct TCP connection with the destination platform, downloads the information, stores it for future use, and transmits it to the requesting platform. All of this is transparent to the user at the requesting platform which operates exactly as if it were communicating with the destination platform. Thus, the need for configuring the requesting platform to suit a particular proxy configuration is eliminated along with the associated overhead. An example of such a network caching technique is embodied in the Web Cache Coordination Protocol (WCCP) provided by Cisco Systems, Inc., a specific embodiment of which is described in copending, commonly assigned, U.S. patent application Ser. No. 08/946,867 for METHOD AND APPARATUS FOR FACILITATING NETWORK DATA TRANSMISSIONS filed Oct. 8, 1997, the entirety of which is incorporated herein by reference for all purposes.

Each cache system has a particular capacity. For example, a cache system may be configured to handle four buckets of traffic. A bucket is generally defined as $1/256^{th}$ of the total amount of traffic (e.g., IP address space) being handled by a particular group of associated cache systems (commonly referred to as a "cache cluster" or "cache farm"). For example, each bucket represents $1/256^{th}$ of the IP addresses or web servers being spoofed by the cache systems within a particular cache cluster. Conventionally, the buckets are evenly apportioned between the cache systems of a cache cluster. Unfortunately, the capacity may vary from cache system to cache system. When the particular cache cluster has a relatively large amount of traffic (e.g., a fat pipe) and a cache system's capacity is less that its assigned load, the cache system may become quickly overwhelmed. Also, when the number of cache systems within a cluster is reduced, for example, to a single cache system, the remaining cache system may become overwhelmed when it is assigned the full 256 buckets.

When a particular cache system becomes overloaded, the network traffic may become disrupted as the cache system fails to handle the traffic in a timely manner. For example, the cache system may block traffic for a minute or more when it becomes overwhelmed with more packets than even its bypass mechanism can handle. As a result, the cache system may become a bottle neck for the cache cluster's traffic. Therefore, there is a need for improving traffic handling procedures within a cache cluster so that occurrences of cache system overload are minimized.

SUMMARY OF THE INVENTION

Accordingly, the present invention provides an apparatus and method for intelligently assigning a portion of a cluster's traffic (e.g., buckets) to a cache system to minimize overloading of such cache system. In general terms, when a new cache system enters a cache cluster and/or starts up, the new cache system's full bucket allocation is not immediately assigned to the new cache system. Instead, only a portion of the full bucket allocation is initially assigned to the new cache system. Thus, the new cache system is less likely to be immediately overwhelmed as it enters a cache cluster.

In one embodiment, the new cache system's bucket assignment is gradually increased until the cache system is handling it's full bucket allocation or it becomes overloaded. The cache system's load is also checked periodically (e.g., every 30 seconds) to determine whether it has become overloaded. When the cache system becomes overloaded, buckets are immediately shed from the cache system. As a result, if the new cache becomes overloaded, it is unlikely to remain overloaded for a significant period of time. Thus, the new cache system is unlikely to cause a bottle neck for the cluster's network traffic. In sum, the new cache system's load is adjusted until it is handling an optimum number of buckets (e.g., the cache is not underloaded or overloaded). In other embodiments, each cache system's load within the cache cluster continues to be monitored and adjusted so as to facilitate efficient use of each cache system.

In one aspect, the invention pertains to a method for assigning traffic buckets to a cache system. When a new cache system starts up in a cache cluster having a plurality of total buckets, a full bucket allocation is determined for the new cache system. Buckets are assigned to the new cache system using a first technique when the cache cluster is not operating at a maximum load. Buckets are assigned to the new cache system using a second technique that differs from the first technique. The second technique is performed after the first technique. Preferably, the full bucket allocation is assigned to the new cache system when the cache cluster is operating at a maximum load.

In one implementation, the first technique includes periodically monitoring a load of the new cache system. When the new cache system is overloaded, a minimum number of buckets are shed from the new cache system. When the new cache system is underloaded, the minimum number of buckets are added to the new cache system. In a more specific implementation, the minimum number equals a single bucket.

In a specific implementation, the second technique is performed until the full allocation has been assigned to the new cache system or a minimum number of buckets have been added to or shed from the new cache system. In this implementation, a portion of the full bucket allocation is initially assigned to the new cache system. When the new cache system is overloaded and when no buckets have been previously shed, a portion of the assigned buckets are periodically shed from the new cache system. When the new cache system is overloaded and when buckets have been previously shed, a portion of a number of buckets that were previously shed are periodically shed from the new cache system. When the new cache system is not overloaded and when no buckets have been previously shed, a portion of the unassigned buckets are periodically assigned to the new cache system. When the new cache system is not overloaded and when buckets have been previously shed, a portion of a number of buckets that were previously shed are periodically assigned to the new cache system. In a more specific embodiment, the portion of the number of buckets that were previously shed from the new cache system, the portion of the unassigned buckets, and the portion of the assigned buckets are equal to a half portion.

In another implementation of the above method, when an existing cache system leaves the cache cluster or shuts down, a new bucket allocation is determined for each of the remaining cache systems and buckets are assigned to the remaining cache system using the first technique.

In another embodiment, the invention pertains to a computer system operable to assign traffic buckets to a cache system. The computer system includes a memory and a processor coupled to the memory. The memory and the processor are adapted to provide at least some of the above described method operations. In yet a further embodiment, the invention pertains to a computer program product for assigning traffic buckets to a cache system. The computer program product has at least one computer readable medium and a computer program instructions stored within the at least one computer readable product configured to cause a processing device to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
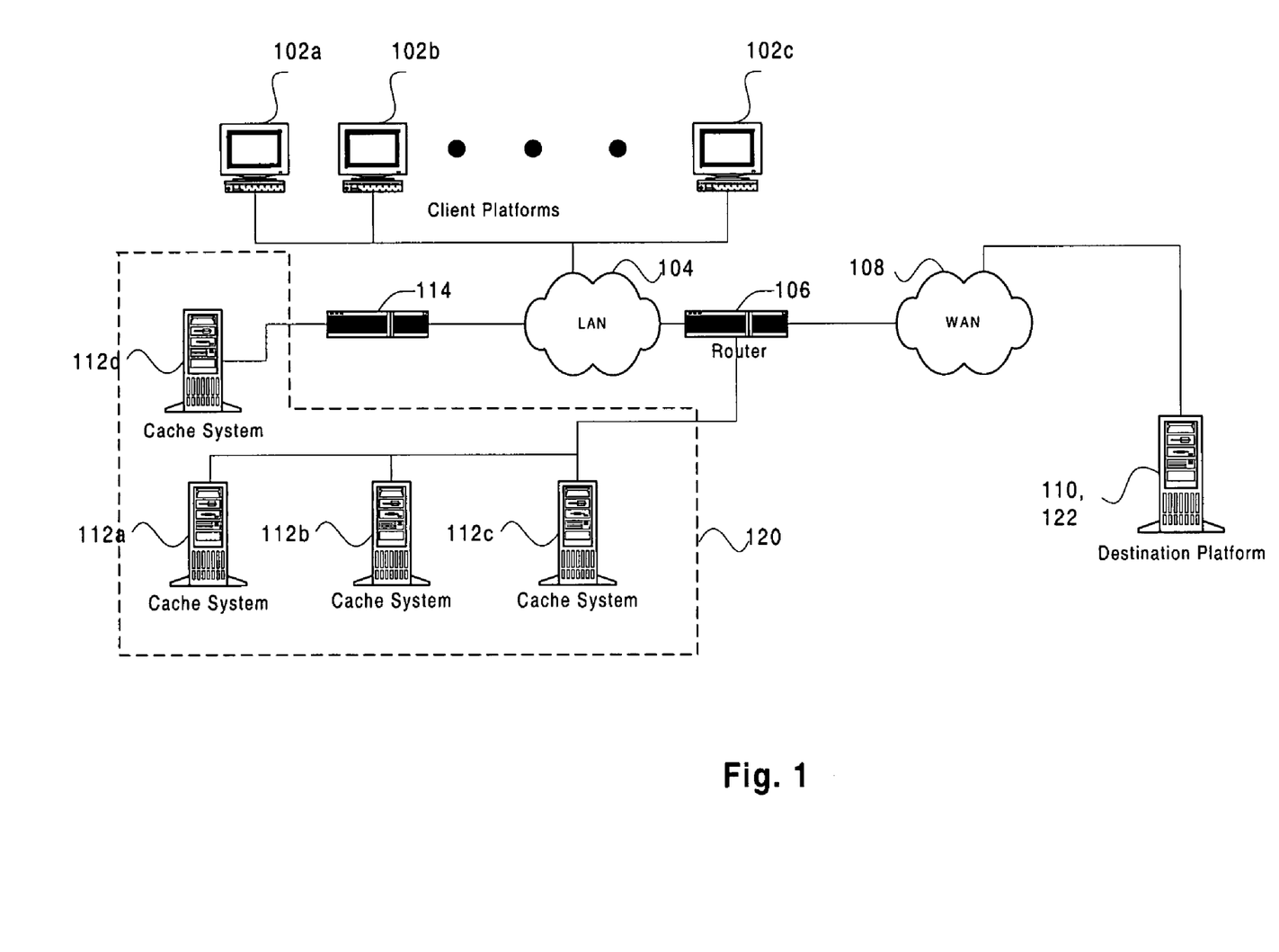
FIG. 1 is a network diagram illustrating cache clusters according to a specific embodiment of the present invention.
Figure 2:
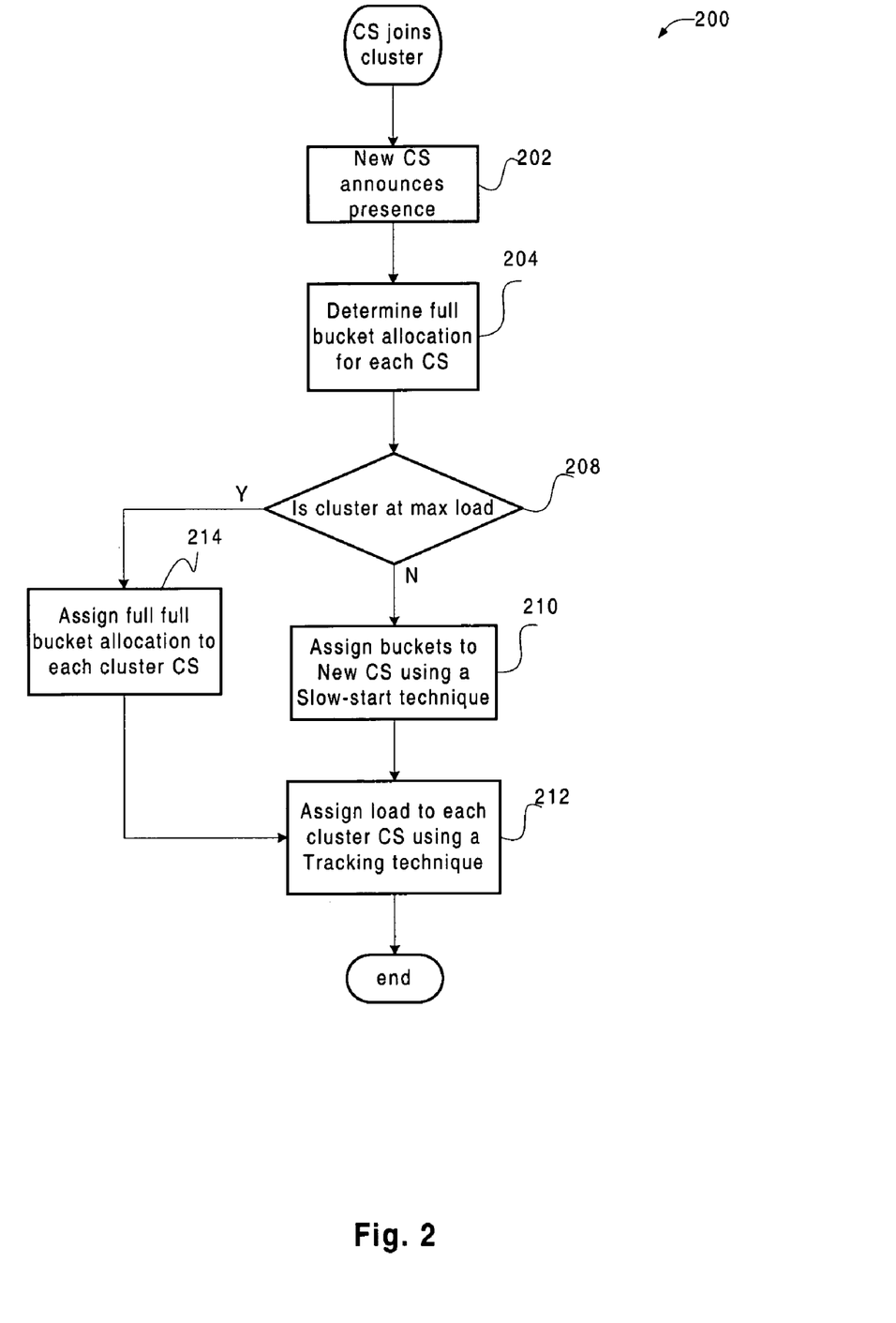
FIG. 2 is a flowchart representing a bucket assignment process for a cache system (CS) that is joining a cluster or starting-up in accordance with one embodiment of the present invention.
Figure 3:
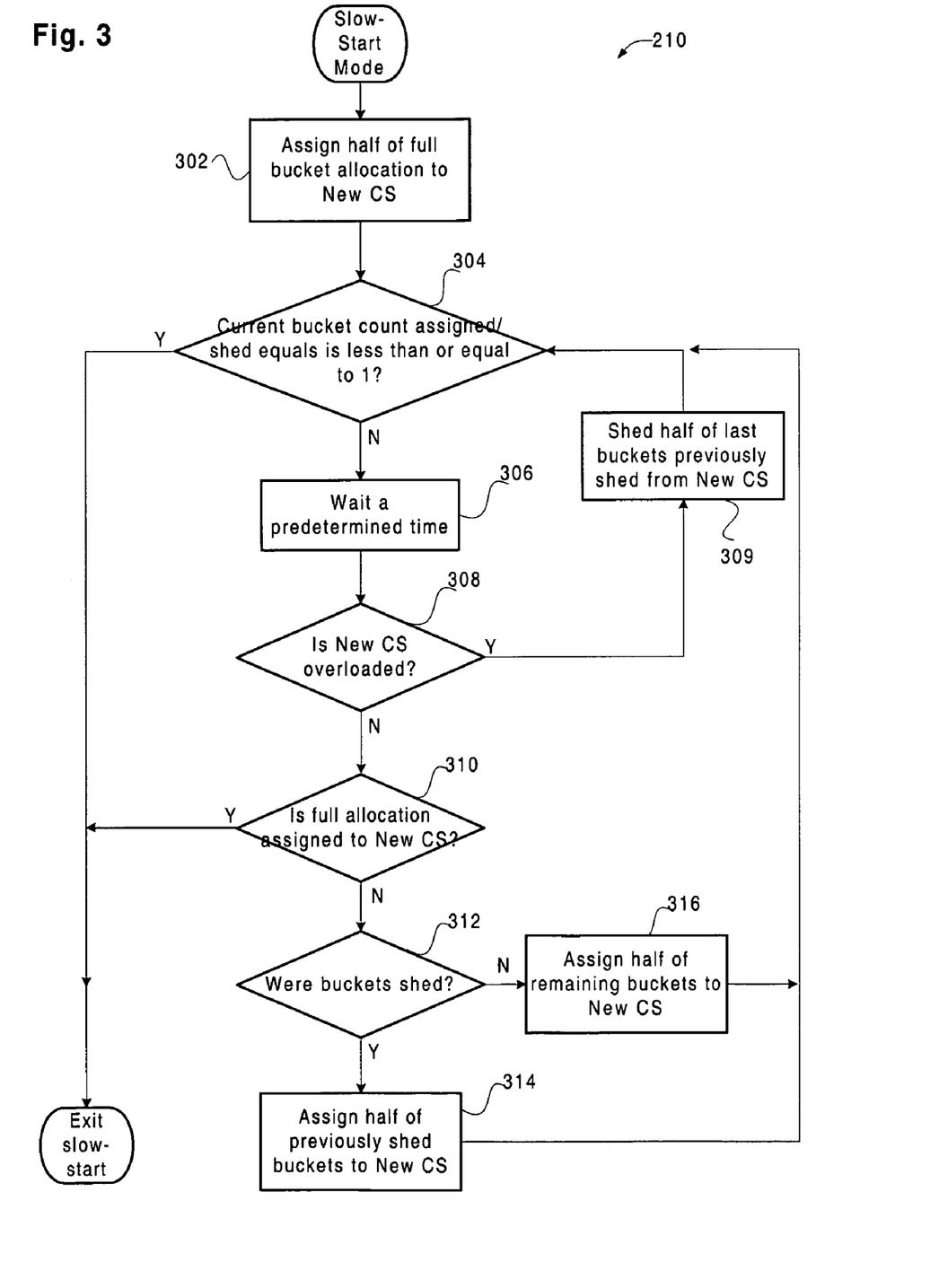
FIG. 3 is a flowchart illustrating the slow-start procedure of FIG. 2 in accordance with one embodiment of the present invention.

FIG. 1 is a simplified network diagram which will be used in conjunction with the flowcharts of FIGS. 2 and 3 to describe a specific embodiment of the present invention. According to this embodiment, a plurality of client machines 102 which are resident on a local area network (LAN) 104 communicate via router 106 and wide area network (WAN) 108, e.g., the internet, with server 110. Of course, some or all of the clients 102 may communicate with the router 106 through various other configurations, rather than through a LAN. For example, a client may be coupled directly to the router 106 or there may be one or more intermediate routers between a client 102 and the router 106.

As discussed above, the router 106 may direct certain traffic, e.g., destined for port 80, to a cache system, such as 112a, which is configured to "spoof" server 110. If there are multiple caches connected to the cache-enabled router, the router selects from among the available caches for a particular request based on the destination IP address specified in the packet. For example, a first set of destination IP addresses may be assigned to cache system 112a; a second set of IP addresses to cache system 112b; and a third set of IP addresses to cache system 112c.

Before sending the packet to one of its associated cache systems, the cache-enabled router 106 encapsulates the packet for transmission to the selected cache system by adding another IP header which designates the router as the source of the packet and the cache system as the destination. That is, the router encapsulates the packet for transmission to a cache system which might be several "hops" away. So, for example, router 106 might encapsulate the packet for transmission to cache system 112d which is connected to router 106 via router 114. Thus, not only may multiple cache systems be associated with a particular router, but multiple routers may be supported by an individual cache system or a group of cache systems. This allows a tremendous amount of flexibility in where the cache system and router need to be in relation to each other.

The selected cache system 112a responds to a request from a client 102 to obtain objects from destination platform 110. The cache system 112a either retrieves objects from destination platform 110 to then present to one of the clients or retrieves objects from its own cache (which objects were previously retrieved from the destination platform 110).

It will be understood that the network cache systems described herein may employ any of a variety of existing file systems and remain within the scope of the invention. For example, the invention may be implemented using a Unix general purpose file system or the equivalent. A particular embodiment of the invention employs the file system described in commonly assigned, U.S. Pat. No. 5,950,205 for DATA TRANSMISSION OVER THE INTERNET USING A CACHE MEMORY FILE SYSTEM issued on Sep. 7, 1999, the entire specification of which is incorporated herein by reference for all purposes.

In the illustrated embodiment, cache systems 112a, 112b, 112c, and 112d form a cache cluster or farm 120 and cache system 122 form a cache cluster 122. Traffic is typically allocated to each cache system within the same cache cluster. Traffic may be allocated based on any suitable factor.

In the illustrated embodiment, traffic is allocated based on IP destination address. That is, each cache system is assigned to handle requests for objects from a particular set of destination addresses. The present invention provides mechanisms for intelligently assigning buckets to each cache system within a cluster so that the cache system is not immediately overwhelmed by object requests, for example. Any suitable mechanism may be utilized for preventing cache system overload. For example, buckets may be slowly assigned to a new cache system upon startup. Additionally, the cache system's may be continuously monitored for overload, as well as underload, and the bucket assignment is then appropriately adjusted. As one or more cache system(s) are pulled from a cluster or shut-down, bucket can also be intelligently re-assigned to minimize traffic bottle-necks.

FIG. 2 is a flowchart representing a bucket assignment process 200 for a cache system (CS) that is joining a cluster or starting-up in accordance with one embodiment of the present invention. Initially, the new CS announces its presence in operation 202 to the other CS's and/or router(s) of the cluster. In response to this announcement, the full bucket allocation for each CS is then determined in operation 204. This bucket allocation procedure may be implemented in any of the router's or CS's associated with the cluster. When allocation is implemented within a CS, that CS is commonly referred to as the "lead CS." The CS with the lowest assigned IP address typically functions as the lead CS.

In one embodiment, the buckets are evenly divided among the cache system's of the cluster. For the cache cluster 120, 64 buckets (i.e., 256/4) are allocated for each CS since there are four CS's (112a–112d). On the other hand, since there is currently only a single CS 110 within the cluster 122, 256 buckets are allocated for CS 110. When a new CS is associated with a particular cluster, buckets from existing CS's are allocated to the new CS in a roughly even manner, i.e., about the same number from each. The router may also attempt to preserve the utility of data already stored in the existing CS's while filling up the new caching engine with new information. Buckets may also be assigned based on any suitable load balancing techniques. That is, buckets are assigned so that traffic is evenly distributed among the CS's of the cluster. For example, the high traffic buckets would not be assigned to the same CS. A weighted load balancing assignment technique is further described below.

After the full bucket allocation is determined for each CS, it is then determined whether the cluster is at maximum load in operation 208. If the cluster is currently handling a maximum load (e.g., prior to start-up of the new CS), the 256 buckets are already apportioned among the existing CS's in chunks that are manageable for the existing CS. Since the new allocation for each CS is a lower number of buckets than the number of buckets currently assigned to the existing CS's, the new CS is likely to able to handle its full allocation of buckets. Thus, if the cluster is at maximum load, the full bucket allocation is then assigned to each cluster CS in operation 214. Of course, it is assumed that the new CS does not have a radically lower capacity than the existing CS's. Typically, when one adds a CS to a cluster, the CS will be an upgraded higher capacity CS. At the very least, the new CS has the same capacity as the other CS's in the cluster. Operations 208 and 214 may be skipped to allow for a more diverse arrangement of CS's with widely variable capacities.

If the cluster is not at maximum load, a relatively large number of buckets may not be assigned to the old CS's. In other words, a large number of buckets may be allocated to the new CS. Thus, the full bucket allocation may then be gradually assigned to the new CS using a slow-start technique in operation 210 so as to not overload the new CS. In general terms, buckets are slowly assigned to the new CS until the full allocation is assigned or the new CS is overloaded. Buckets are then continuously assigned to each cluster CS using a tracking technique in operation 212. In tracking mode, the CS's are continuously monitored for overloading and underloading. The underloaded or overloaded CS's bucket assignment is then appropriately adjusted.

FIG. 3 is a flowchart illustrating the slow-start procedure 210 of FIG. 2 in accordance with one embodiment of the present invention. For exemplary purposes, CS 112d has entered cluster 120, which already has existing CS's 112a, 112b, and 112c. When the slow-start procedure 210 is implemented for new CS 112d, half of the full bucket allocation is assigned to the new CS 112d in operation 302. In this example, the full allocation is 64 buckets; therefore, CS 112d is initially assigned 32 buckets.

It is then determined whether the current bucket count that was assigned/shed is less than or equal to one bucket in operation 304. If the current bucket count assigned/shed is less than or equal to one, then slow-start mode is exited. Tracking mode is then implemented on the new CS 112d, as well as the other CS's (112a through 112c). In the illustrated tracking mode embodiment, the CS is monitored for under-load or overload and a single bucket may then be shed/assigned accordingly. Of course, tracking mode may be entered upon reaching any other suitable bucket count that was assigned or shed.

If the count is not less than one, the slow-start mode is not exited (and the tracking mode is not entered). Instead, the process waits for a predetermined time in operation 306. The predetermined time is selected based on any number of factors, such as a desire to reduce the amount of time a CS remains overloaded, minimize the amount of overhead required to monitor the CS, the time by which load is assumed to decrease after being shed and/or the time required by the CS to shed load. In the illustrated embodiment, 30 seconds appears to work well.

It is then determined whether the new CS is overloaded in operation 308. Any suitable mechanism may be utilized to determine whether the new CS is overloaded. For example, each CS may include a readable memory location in the form of an overload flag for indicating overload. The lead CS may then read the new CS's overload flag to determine whether it is overloaded. In an alternate embodiment, the new CS may be configured to send a message to the lead CS indicating whether it is overloaded or not.

In a specific WCCP v2 implementation, a CS sends a "WCCP2_BUCKET_LOAD_REQUEST" message every 30 seconds to the lead CS (or router). The time interval is preferably configurable. This message tells the lead CS whether the new CS can take more load or needs to shed some load. If the new CS needs to shed load, it may also specify how much load to shed. In a more specific embodiment, the message contains the following standard WCCP v2 message components:

| Message Header |
| Security Component |
| Service Component |

The above common header is well described in the co-pending U.S. Provisional Application No. 60/168,862 for METHOD AND APPARATUS FOR REDIRECTING NETWORK TRAFFIC filed Dec. 2, 1999, the entirety of which is incorporated herein by reference for all purposes. For implementation of one embodiment of the present invention, the message contains the following additional message components:

| Web Cache Identity Info Component |
| WC Load Component |

The Web Cache Identity Component identifies the CS (e.g. the same way as in the "Here I am" messages from the CS). For example, it has information regarding the IP address of the CS and the buckets assigned to it. The Web Cache Identity Info component is also described further in the above referenced provisional application. The Web Cache Load Component contains information regarding the load status of the CS. For example, it has the following fields:

| Load State Flag |
| No. of Buckets to Shed/Add (if any) |
| List of Buckets |

The Load State Flag indicates whether the CS is under- or overloaded. The meaning of the No. of Buckets to Shed/Add Field depends on the state of the Load State Flag. When the Load State Flag indicates overload, the No. of Buckets to Shed/Add Field indicates how many bucket needs to be shed so the CS will not be overloaded. When the Load State Flag indicates underload, the No. of Buckets to Shed/Add Field indicates how many bucket needs to be add so the CS will not be underloaded. Of course, if the No. of Buckets to Shed/Add Field is set to a value of zero, the CS is in a stable state (i.e., not under- or overloaded). The List of Buckets indicates which buckets that the overloaded CS wishes to shed.

Which buckets to shed may also be determined by selecting the buckets that are currently being bypassed by the CS. In one embodiment, the shedding of buckets may be a three-way process. A message is sent to the lead CS to shed the buckets and then the lead CS informs the router. However, this process may not be quick enough to reduce load on the CS. Accordingly, the CS may initially shed the buckets by sending them back to the router through a packet return (or bypassing) mechanism. One embodiment of a packet return mechanism is described further in the above referenced U.S. provisional application, which is incorporated herein by reference. Once the lead CS is able to inform the router, the load for these bypassed buckets is not seen in the shedding CS.

Which buckets to add may be determined by analyzing the history of the buckets that were previously assigned to the CS and then shed. Accordingly, load balancing techniques that were previously implemented by the lead CS (or router) to allocate and assign buckets need not be repeated. Of course, which buckets to shed may merely be randomly determined.

Referring back to FIG. 3, if the new CS is overloaded, then a number equal to half of last buckets previously shed from new CS is shed from the new CS in operation 309. Of course, any suitable number of buckets may be shed from the new CS to relieve the overload. Alternatively, the number of buckets shed may equal the No. of Buckets to Shed/Add indicated in the WC Load Component. After the buckets are shed, 304 through 308 are repeated until one of three events occur: (1) the current bucket count assigned or shed from the new CS is equal to or less than one (2) the full bucket allocation is assigned to CS or (3) the new CS is not overloaded. When events #1 or #2 occur, the slow-start procedure ends.

When it is determined that the new CS is not overloaded (event #3), a determination is then made as to whether or not the full bucket allocation is assigned to the new CS in operation 310. If the full bucket allocation is not assigned, it is then determined whether there were any buckets previously shed in operation 312. If buckets were shed, then half of the previously shed buckets are assigned to the new CS in operation 314. If there were no buckets previously shed, then half of the remaining buckets are assigned to the new CS in operation 316. Operations 304 through 310 are then repeated until the current bucket count assigned or shed from the new CS is equal to or less than one or the full bucket allocation is assigned to CS. The slow-start procedure then ends, and the tracking procedure is then performed on the new CS, as well as the other CS's within the cluster.

Figure 4:
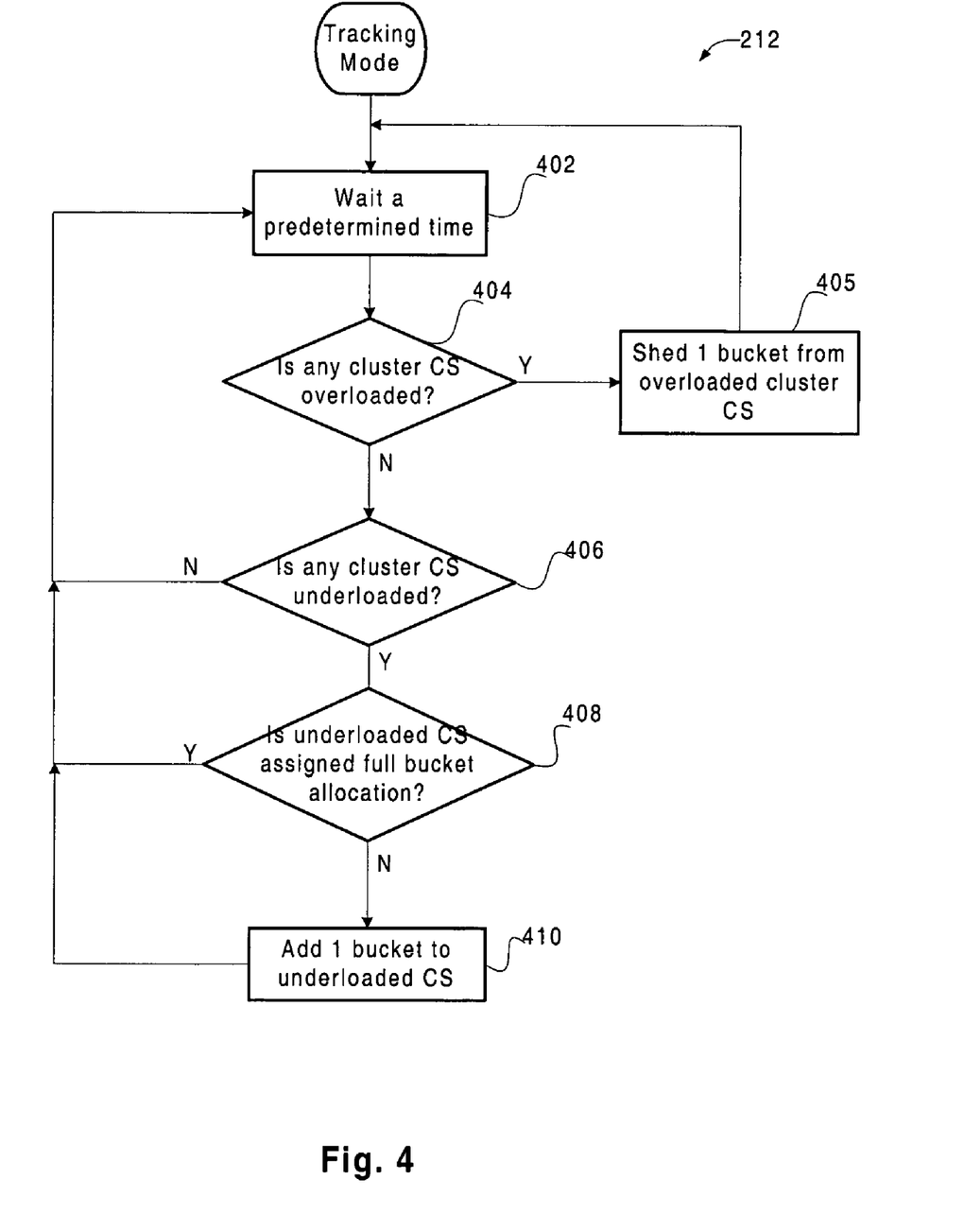
FIG. 4 is a flowchart illustrating the tracking procedure of FIG. 2 in accordance with one embodiment of the present invention.

FIG. 4 is a flowchart illustrating the tracking procedure 212 of FIG. 2 in accordance with one embodiment of the present invention. Initially, the process waits a predetermined time (e.g., 30 seconds) in operation 402. It is then determined whether any cluster CS is overloaded in operation 404. If a cluster CS is overloaded, a single bucket is shed in operation 405 and the process again waits the predetermined time in operation 402. A single bucket continues to be shed every predetermined time until the CS is no longer overloaded.

When the CS is not overloaded, it is then determined whether any cluster CS is underloaded in operation 406. If a cluster CS is underloaded, it is then determined whether the underloaded CS is assigned a full bucket allocation in operation 408. If the underloaded CS is not assigned a full bucket allocation, a single bucket is then added to the underloaded CS in operation 410. In contrast, if the CS is assigned a full bucket allocation, this operation 410 is skipped and a bucket is not added. Additionally, if the CS is not underloaded, operations 408 and 410 are skipped. The tracking procedure then repeats at operation 402.

In addition to providing mechanisms for intelligently assigning buckets upon start-up of a new cluster, mechanisms may also be provided for intelligently assigning buckets to the remaining CS's when a CS exits from a cluster or is shut-down. In one embodiment, the slow-start procedure is implemented to assign the buckets left by the exiting CS to the remaining CS's. However, the slow-start procedure may immediately overburden all of the remaining CS's if they were operating at close to maximum capacity prior to the CS leaving the cluster. Alternatively, the slow start procedure may be implemented to assign all of the buckets of the cluster to the remaining CS's. However, this may cause the remaining CS's to in effect shed a significant portion of their assigned buckets. The CS's assigned bucket then slowly increase until the new full bucket allocation is reached again. This is likely to occur when the cluster is operating at close to a maximum load, in which case each remaining CS should preferably continue to handle a significant number of buckets.

Figure 5:
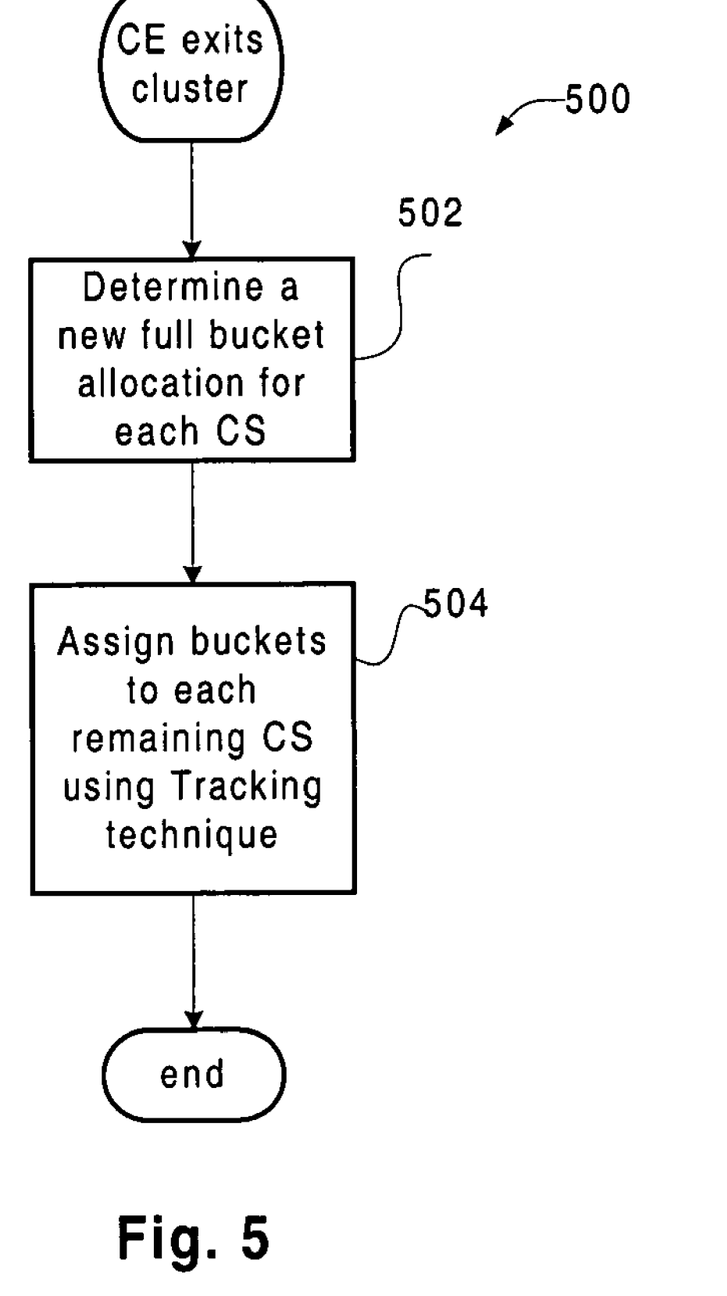
FIG. 5 is a flow chart illustrating a procedure for assigning buckets when a CS leaves a cluster in accordance with one embodiment of the present invention.

Another approach is to utilize some form of tracking procedure. This approach is more conservative than using the slow-start technique to assign the remaining cluster buckets and more efficient than using the slow-start technique to assign the total cluster buckets. FIG. 5 is a flow chart illustrating a procedure 500 for assigning buckets when a CS leaves a cluster in accordance with one embodiment of the present invention. Initially, a new full bucket allocation is determined in operation 502. For example, the buckets are evenly divided among the remaining CS's. In operation 504, the remaining buckets are then incrementally assigned to each CS using the tracking technique, e.g., as illustrated in FIG. 4. The tracking procedure prevents the remaining CS's from being immediately overloaded upon exit of a CS. Instead, single buckets are slowly assigned every 30 seconds, for example, to each non-overloaded CS until the full bucket allocation is reached.

Other mechanisms may also be provided for intelligently determining the full bucket allocation for each CS (besides merely evenly dividing the buckets among the CS's). For example, each CS may have an associated weight value that indicates what maximum percentage of the cluster load that may be allocated to such CS. By way of a specific example, a cluster having four high-powered CS's and a lower powered CS may evenly allocate 95% of the total buckets to the high-powered CS's, and the remaining 5% is allocated to the low-powered CS. In one embodiment, a CS communicates a weight value within a message to the lead CS (e.g., the WCCP2_BUCKET_LOAD_REQUEST message). This weight value may then be taken into account when calculating the full bucket allocation for the associated CS. The above described slow-start and tracking procedure may then be used to monitor and adjust the CS's bucket assignment, for example, until the full bucket allocation is assigned to the CS.

Mechanisms may also be provided for communicating bucket assignment information and load status of each of the CS's to each one of the other CS's within a cluster. This mechanism allows a non-lead CS to take over the functions of a lead CS if the lead CS exits from the cluster. That is, any one of the CS's may become the lead when the lead CS exits the cluster. This function may be implemented in any suitable manner. In one specific implementation, the lead CS periodically (e.g., every 30 seconds) broadcasts a "WCCP2_BUCKET_LOAD_UPDATE message to all of the CS's within its cluster. This message contains information on the bucket allotment for all the CS's in the cluster. In one specific embodiment, the "WCCP2_BUCKET_LOAD_UPDATE" message contains the following components for each CS (in addition to the standard components such as Message Header, Security Component, and Service Component):

The Identity (IP address for CS)
The Allocated Hash (buckets allocated to this CS
Assignment Number (IP + Change)

The Allocated Hash is the full buckets allocation for this CS. The Assignment Number is the identification that determines the buckets that are actually being serviced by this CS. The buckets actually serviced by the CS's is transmitted in the "I see you" message sent by the router to each of the CS's. Alternatively, the lead CS may broadcast this information. The CS's may then use these two pieces of information to determine what part of the load is still unassigned (e.g., by subtracting the number of assigned buckets from the number of buckets actually being serviced by the router). Each response message may also include an assignment key so that the CS may determine whether it has the latest update (i.e., by comparing the key from router response and the lead CS response).

In this embodiment, a CS may also request this information by sending a "WCCP2_BUCKET_LOAD_QUERY" message to the lead CS and the router. In a specific embodiment, this message may include the following components (in addition to the standard components):

> Component Header
> Cache Version
> Sender CS IP address
> Target CS IP Address The Component Header indicates a WCCP2_BUCKET_LOAD_QUERY message, and the Cache Version indicates the version of InterCache protocol. The Sender CS IP Address specifies the requesting CS's IP address so the lead CS can respond back to the correct CS. The Target CS IP Address specifies which CS the requesting CS wishes to receive information about.

Several embodiments of the present invention provide a number of advantages. For example, specific embodiments allow flexibility in the capacity of individual cache systems within a particular cache cluster. That is, the cache systems of a particular cluster may have different capacities since load is intelligently assigned to each cache. For instance, a small-capacity cache system may be used within a cluster of mostly high-capacity cache systems without significantly interfering with traffic. For example, the lower capacity cache system is unlikely to become overloaded and thereby form a bottleneck since load is assigned so as to match the capacity of the cache system. In contrast, conventional bucket management techniques typically divide the cluster's load evenly between the cache systems and immediately assign the full bucket allocation to each cache system. As a result, a cache system with a lower-level capacity may become overwhelmed when implementing conventional bucket assignment mechanisms.

The above described allocation and assignment mechanisms of the present invention may also be utilized in conjunction with the flow protection mechanisms described in co-pending U.S. patent application Ser. No. 09/476,188 by Kwok et al., entitled METHODS AND APPARATUS FOR REDIRECTING NETWORK TRAFFIC, filed on 3 Jan. 2000, which application is herein incorporated by reference in its entirety. The flow protection mechanism generally prevent traffic from being disrupted when a CS enters or exits the cluster. Likewise, the assignment mechanisms allow a CS to enter or exit a cluster without disrupting traffic (e.g., by a CS becoming overloaded). These two mechanisms together provide significant flexibility in CS arrangements. For example, one may easily upgrade a CS cluster by adding a high-power CS and/or taking a low-power CS away without causing significant traffic disruption. By way of another example, a cluster may have CS with widely varying capacity since mechanisms for intelligent assigning and/or shedding buckets from a CS are provided. Additionally, a lower incidence of traffic disruptions contributes to the transparency aspect of the CS's.

Generally, the bucket allocation and assignment techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid bucket allocation and assignment system of this invention is preferably implemented on a general-purpose programmable machine selectively activated or reconfigured by a computer program stored in memory. The programmable machine may be in the form of a general purpose computer that is configured to implement a cache system. The computer system generally includes a memory, processor, and network interface modules.

Such programmable machine may also be a network device designed to handle network traffic. Such network devices typically have multiple network interfaces including frame relay and ISDN interfaces, for example. Specific examples of such network devices include routers and switches. For example, the allocation and assignment systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the bucket assignment system may be implemented on a general-purpose network host machine such as a personal computer or workstation. Further, the invention may be at least partially implemented on a card (e.g., an interface card) for a network device or a general-purpose computing device.

Figure 6:
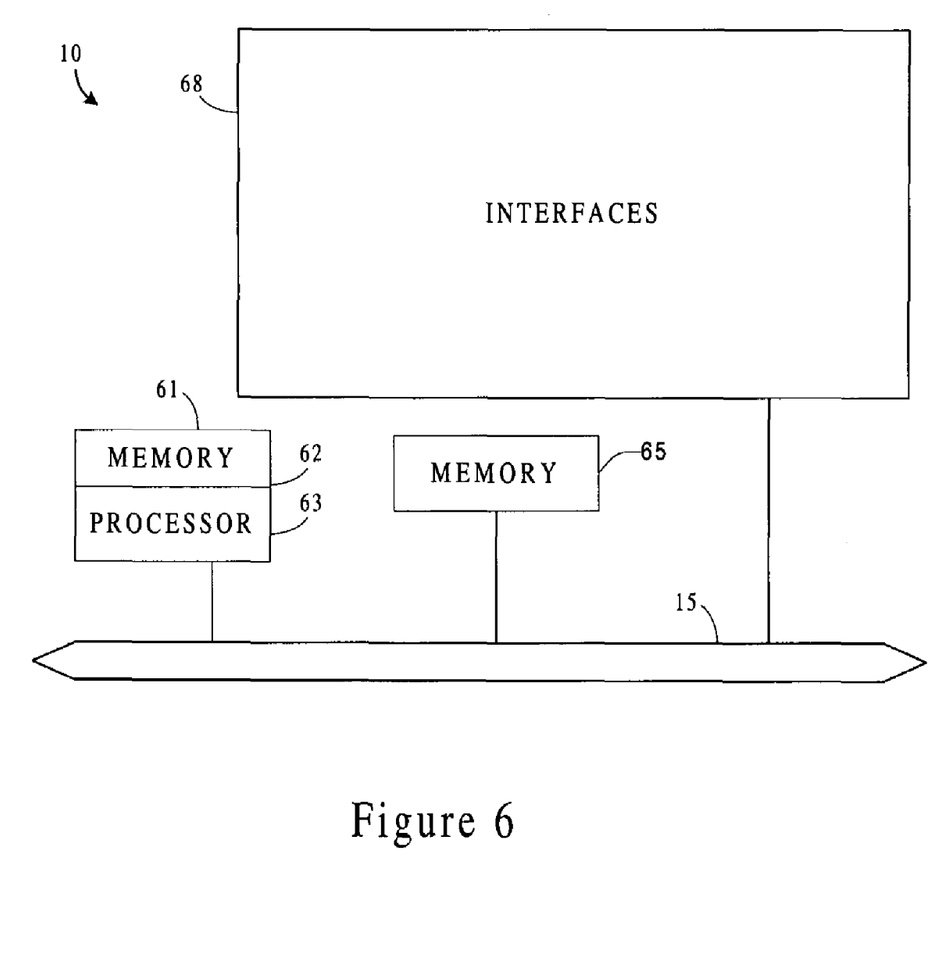
FIG. 6 is a diagrammatic representation of a router in accordance with one embodiment of the present invention.

Referring now to FIG. 6, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for determining full bucket allocation for a new CS, assigning buckets to a CS in slow-start mode or tracking mode, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or bucket allocation and assignment mechanisms described herein. The program instructions may control the operation of an operating system and/or one or more applications, for example. The memory or memories may also be configured to store the above described message components, the current number of buckets being shed or assigned for each CS, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

By way of further implementation, the bucket assignment mechanisms and/or flow protection mechanisms may be utilized with cache systems that were integrated within the router itself as RAM-based cache blades. The router may be configured to allow expandable and/or replaceable RAM-based cache blades.

Although the foregoing invention has been described in some detail for purposes of clarity of understanding, it will be apparent that certain changes and modifications may be practiced within the scope of the appended claims. For instance, although a slow-start technique and then a tracking technique is described as being implemented on a new CS, the tracking technique may be exclusively utilized on the new CS. Therefore, the described embodiments should be taken as illustrative and not restrictive, and the invention should not be limited to the details given herein but should be defined by the following claims and their full scope of equivalents.

What is claimed is:

1. A method for assigning traffic buckets to a cache system, the method comprising:
    a) when a new cache system starts up in a cache cluster having a plurality of cache systems among which a plurality of total buckets are to be allocated, distributing the total buckets among the cache systems, including the new cache system, so that a full bucket allocation is determined for the new cache system and assigning a portion of the full bucket allocation to the new cache system that was determined at start up;
    b) periodically determining a load of the new cache system;
    c) each time it is periodically determined that the new cache system is underloaded and buckets have not been previously shed from the new cache system, slowly assigning a portion of the full bucket allocation that was determined at startup without redistributing the total buckets among the cache systems, including the new cache system, unless the cache cluster is operating at a maximum load;
    d) each time it is periodically determined that the new cache system is underloaded and buckets have been shed previously from the new cache system, slowly re-assigning a portion of the buckets that have been previously shed from the new cache system to the new cache system without redistributing the total buckets among the cache systems, including the new cache system, unless the cache cluster is operating at a maximum load; and
    e) each time it is periodically determined that the new cache system is overloaded, shedding a portion of the buckets previously assigned to the new cache system without redistributing the total buckets among the cache systems, including the new cache system;
    wherein each bucket portion corresponds to a portion of the total traffic being handled by the cache cluster.

2. A method as recited in claim 1 further comprising assigning the full bucket allocation to the new cache system when the cache cluster is operating at a maximum load.

3. A method as recited in claim 1, wherein shedding a portion of the buckets previously assigned to the new cache comprises:
    when no buckets have been previously shed, periodically shedding a portion of the assigned buckets from the new cache system;
    when buckets have been previously shed, periodically shedding a portion of a number of buckets that were previously shed from the new cache system.

4. A method as recited in claim 3 further comprising after the full allocation of buckets is assigned to the new cache system or the last assigned or shed number of buckets for the new cache system is less than or equal to one:
    halting operations (b) through (e);
    e) periodically monitoring a load of each of the other cache systems, including the new cache system, within the cache cluster;
    f) when any of the cache systems is overloaded, shedding a minimum number of buckets from the overloaded cache system; and
    g) when any of the cache systems is underloaded, adding the minimum number of buckets to the underloaded cache system.

5. A method as recited in claim 4, wherein the minimum number of buckets equals a single bucket, the portion of the full bucket allocation equals a half of the full bucket allocation, and the portion of a number of buckets that were previously shed equals half of the number of buckets that were previously shed.

6. A method as recited in claim 4 further comprising:
    when an existing cache system leaves the cache cluster or shuts down, determining a new bucket allocation for each of the remaining cache systems; and
    assigning buckets to the remaining cache system using the new bucket allocation with operations (e) through (g).

7. A method as recited in claim 3 further comprising:
receiving load information from the new cache, the load information indicating whether the new cache system is overloaded; and
using the load information to determine whether the new cache is overloaded.

8. A method as recited in claim 7 wherein load information is periodically received from the new cache system.

9. A method as recited in claim 7 wherein the load information further indicates a number of buckets to shed or add, wherein the portion of the number of buckets that were previously shed from the new cache system and the portion of the assigned buckets are equal to the indicated number of buckets to shed or add.

10. A method as recited in claim 1 wherein the operations (b) through (e) are performed until the full allocation has been assigned to the new cache system or a minimum number of buckets have been added to or shed from the new cache system.

11. A method as recited in claim 10 wherein operations (b) through (e) are performed about every 30 seconds.

12. A method as recited in claim 1, wherein the full bucket allocation is equal to a number of buckets allocated to each existing cache system within the cache cluster.

13. A method as recited in claim 1, wherein the full bucket allocation is not equal to a number of buckets allocated to each existing cache system within the cache cluster.

14. A method as recited in claim 13, further comprising receiving a weight value from the new cache system indicating a percentage of the total buckets to allocate the new cache system.

15. A computer system operable to assign traffic buckets to a cache system, comprising:
a memory; and
a processor coupled to the memory,
  a) when a new cache system starts up in a cache cluster having a plurality of cache systems among which a plurality of total buckets are to be allocated, distributing the total buckets among the cache systems, including the new cache system, so that a full bucket allocation is determined for the new cache system and assigning a portion of the full bucket allocation to the new cache system that was determined at start up;
  b) periodically determining a load of the new cache system;
  c) each time it is periodically determined that the new cache system is underloaded and buckets have not been previously shed from the new cache system, slowly assigning a portion of the full bucket allocation that was determined at startup without redistributing the total buckets among the cache systems, including the new cache system, unless the cache cluster is operating at a maximum load;
  d) each time it is periodically determined that the new cache system is underloaded and buckets have been shed previously from the new cache system, slowly re-assigning a portion of the buckets that have been previously shed from the new cache system to the new cache system without redistributing the total buckets among the cache systems, including the new cache system, unless the cache cluster is operating at a maximum load; and
  e) each time it is periodically determined that the new cache system is overloaded, shedding a portion of the buckets previously assigned to the new cache system without redistributing the total buckets among the cache systems, including the new cache system,
wherein each bucket portion corresponds to a portion of the total traffic being handled by the cache cluster.

16. A computer system as recited in claim 15, wherein at least one of the memory and the processor are further adapted to provide:
assigning the full bucket allocation to the new cache system when the cache cluster is operating at a maximum load.

17. A computer system as recited in claim 15, wherein at least one of the memory and the processor are further adapted to provide after the full allocation of buckets is assigned to the new cache system or the last assigned or shed number of buckets for the new cache system is less than or equal to one:
halting operations (b) through (e);
e) periodically monitoring a load of each of the other cache systems, including the new cache system, within the cache cluster;
f) when any of the cache systems is overloaded, shedding a minimum number of buckets from the overloaded cache system; and
g) when any of the cache systems is underloaded, adding the minimum number of buckets to the underloaded cache system.

18. A computer system as recited in claim 17 wherein at least one of the memory and the processor are further adapted to provide:
when an existing cache system leaves the cache cluster or shuts down, determining a new bucket allocation for each of the remaining cache systems; and
assigning buckets to the remaining cache system using the new bucket allocation with operations (e) through (g).

19. A computer system as recited in claim 15, wherein the portion of the number of buckets that were previously shed from the new cache system, the portion of the full bucket allocation, and the portion of the assigned buckets are equal to a half portion.

20. A computer program product for assigning traffic buckets to a cache system, the computer program product comprising:
at least one computer readable medium;
computer program instructions stored within the at least one computer readable product configured to:
  (a) when a new cache system starts up in a cache cluster having a plurality of cache systems among which a plurality of total buckets are to be allocated, distributing the total buckets among the cache systems, including the new cache system, so that a full bucket allocation is determined for the new cache system and assigning a portion of the full bucket allocation to the new cache system that was determined at start up;
  b) periodically determining a load of the new cache system;
  c) each time it is periodically determined that the new cache system is underloaded and buckets have not been previously shed from the new cache system, slowly assigning a portion of the full bucket allocation that was determined at startup without redistributing the total buckets among the cache systems, including the new cache system unless the cache cluster is operating at a maximum load;
  d) each the it is periodically determined that the new cache system is underloaded and buckets have been shed previously from the new cache system, slowly reassigning a portion of the buckets that have been previously shed from the new cache system to the new cache system without redistributing the total buckets among the cache systems, including the new cache system, unless the cache cluster is operating at a maximum load; and e) each time it is periodically determined that the new cache system is overloaded, shedding a portion of the buckets previously assigned to the new cache system without redistributing the total buckets among the cache systems, including the new cache system, wherein each bucket portion corresponds to a portion of the total traffic being handled by the cache cluster.

21. A computer program product as recited in claim 20, wherein the computer program instructions are further configured to assign the full bucket allocation to the new cache system when the cache cluster is operating at a maximum load.

22. A computer program product as recited in claim 20, wherein shedding a portion of the buckets previously assigned to the new cache comprises:
    when no buckets have been previously shed, periodically shedding a portion of the assigned buckets from the new cache system;
    when buckets have been previously shed, periodically shedding a portion of a number of buckets that were previously shed from the new cache system.

23. A computer program product as recited in claim 22 wherein the computer program instructions are further configured to after the full allocation of buckets is assigned to the new cache system or the last assigned or shed number of buckets for the new cache system is less than or equal to one:
    halt operations (b) through (e);
    e) periodically monitor a load of each of the other cache systems, including the new cache system, within the cache cluster;
    f) when any of the cache systems is overloaded, shed a minimum number of buckets from the overloaded cache system; and
    g) when any of the cache systems is underloaded, add the minimum number of buckets to the underloaded cache system.

24. A computer program product as recited in claim 23, wherein the minimum number of buckets equals a single bucket, the portion of the full bucket allocation equals a half of the full bucket allocation, and the portion of a number of buckets that were previously shed equals half of the number of buckets that were previously shed.

25. A computer program product as recited in claim 23, wherein the computer program instructions are further configured to:
    when an existing cache system leaves the cache cluster or shuts down, determine a new bucket allocation for each of the remaining cache systems; and
    assign buckets to the remaining cache system using the new bucket allocation with operations (e) through (g).

26. A computer program product as recited in claim 22, wherein the computer program instructions are further configured to:
    receive load information from the new cache, the load information indicating whether the new cache system is overloaded; and
    use the load information to determine whether the new cache is overloaded.

27. A computer program product as recited in claim 26, wherein load information is periodically received from the new cache system.

28. A computer program product as recited in clam 38, wherein the load information further indicates a number of buckets to shed or add, wherein the portion of the number of buckets that were previously shed from the new cache system and the portion of the assigned buckets are equal to the indicated number of buckets to shed or add.

29. A computer program product as recited in claim 20, wherein the operations (b) through (e) are performed until the full allocation has been assigned to the new cache system or a minimum number of buckets have been added to or shed from the new cache system.

30. A computer program product as recited in claim 29, wherein operations (b) through (e) are performed about every 30 seconds.

31. A computer program product as recited in claim 20, wherein the full bucket allocation is equal to a number of buckets allocated to each existing cache system within the cache cluster.

32. A computer program product as recited in claim 20, wherein the full bucket allocation is not equal to a number of buckets allocated to each existing cache system within the cache cluster.

33. A computer program product as recited in claim 32, wherein the computer program instructions are further configured to receive a weight value from the new cache system indicating a percentage of the total buckets to allocate the new cache system.

34. An apparatus for assigning traffic buckets to a cache system, comprising:
    means for when a new cache system starts up in a cache cluster having a plurality of cache systems among which a plurality of total buckets are to be allocated, distributing the total buckets among the cache systems, including the new cache system, so that a full bucket allocation is determined for the new cache system and assigning a portion of the full bucket allocation to the new cache system that was determined at start up;
    means for periodically determining a load of the new cache system;
    means for each time it is periodically determined that the new cache system is underloaded and buckets have not been previously shed from the new cache system, slowly assigning a portion of the full bucket allocation that was determined at startup without redistributing the total buckets among the cache systems, including the new cache system, unless the cache cluster is operating at a maximum load;
    means for each time it is periodically determined that the new cache system is underloaded and buckets have been shed previously from the new cache system, slowly assigning a portion of the buckets that have been previously shed from the new cache system to the new cache system without redistributing the total buckets among the cache systems, including the new cache system unless the cache cluster is operating at a maximum load; and
    means for each time it is periodically determined that the new cache system is overloaded, shedding a portion of the buckets previously assigned to the new cache system without redistributing the total buckets among the cache systems, including the new cache system,
    wherein each bucket portion corresponds to a portion of the total traffic being handled by the cache cluster.

* * * * *